PRIORITY
RECALL
CALL
INTERCEPT
93
900
306
604
705
803

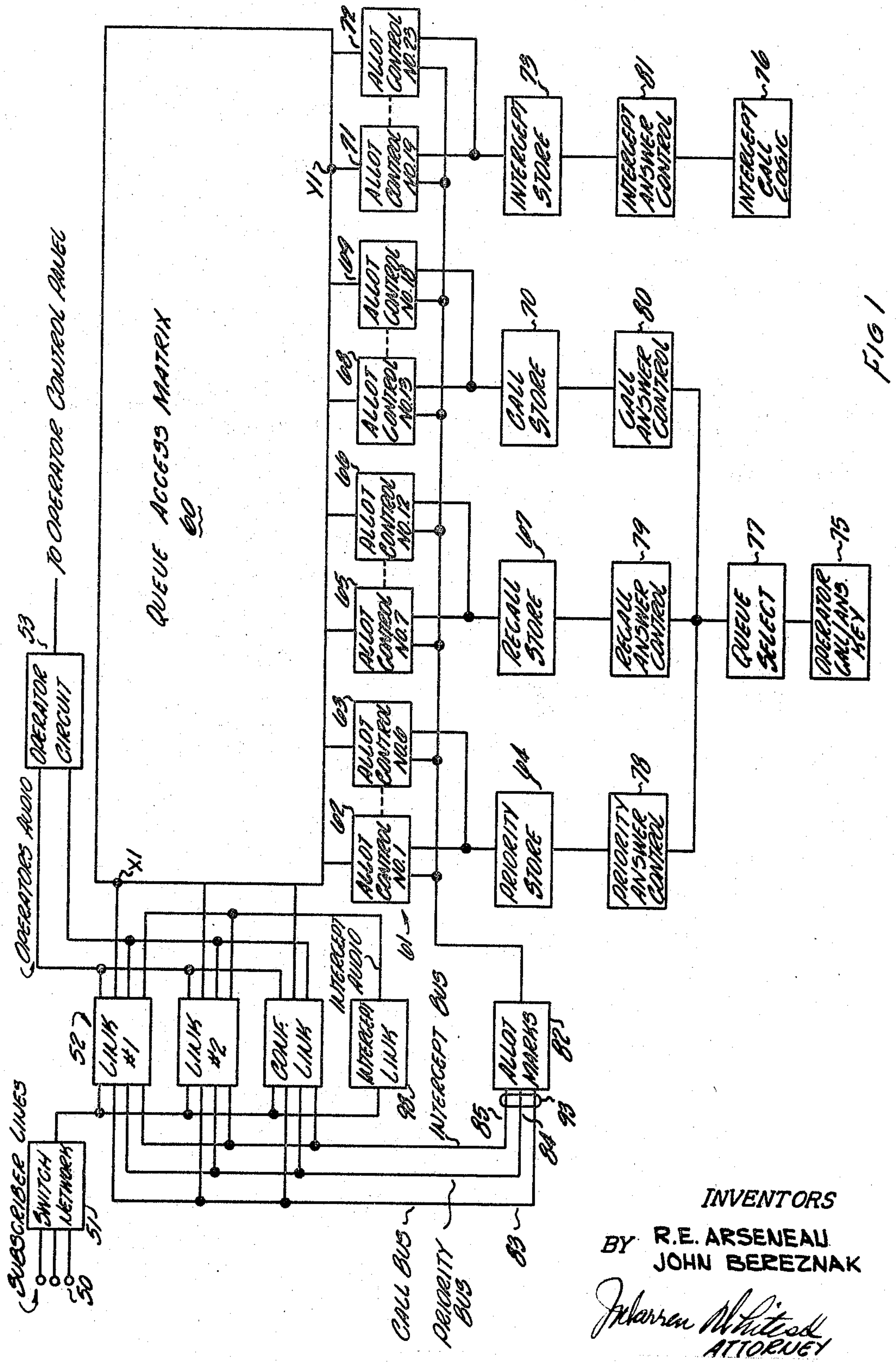
QUEUE ACCESS MATRIX
60
TO OPERATOR CONTROL PANEL
OPERATOR CIRCUIT
53
OPERATORS AUDIO
ALLOT CONTROL NO. 23
72
ALLOT CONTROL NO. 14
71
Y12
ALLOT CONTROL NO. 18
109
ALLOT CONTROL NO. 13
68
ALLOT CONTROL NO. 12
66
ALLOT CONTROL NO. 7
65
ALLOT CONTROL NO. 6
63
ALLOT CONTROL NO. 1
62
X1
61
INTERCEPT STORE
73
INTERCEPT ANSWER CONTROL
81
INTERCEPT CALL LOGIC
76
CALL STORE
70
CALL ANSWER CONTROL
80
RECALL STORE
67
RECALL ANSWER CONTROL
79
QUEUE SELECT
77
OPERATOR CALL/ANS. KEY
75
PRIORITY STORE
64
PRIORITY ANSWER CONTROL
78
FIG 1
LINK #1
52
LINK #2
CONF. LINK
INTERCEPT AUDIO
INTERCEPT LINK
98
INTERCEPT BUS
ALLOT MARKS
82
85
84
93
83
SUBSCRIBER LINES
SWITCH NETWORK
51
50
CALL BUS
PRIORITY BUS
INVENTORS
BY R.E. ARSENEAU
JOHN BEREZNAK
ATTORNEY TO OPERATOR CIRCUIT 53
52
LINK CIRCUIT
91
92
CURRENT DETECTOR
90
85
84
LINE FIRING
93
QUEUE ACCESS MATRIX 60
X1
PRI
INT
SEC
303
Y1
Q1, Q12
ALLOT
MARK
300
301
ALLOT
DOUBLE
DROP
HOLD STAGE
302
705
306
BUSY
304
314
604
310
DIFF
1, 2, --OR 12
312
313
311
ANSWER INPUT BUS 62
PRIORITY
RECALL 65
CALL 68
A1, A5
1,5
BUSY
Q1, Q5
INTERCEPT 71
STORE PULSE
1,5
315
530
ALLOT CONTROL

502
501
500
UNITS
TENS
HUNS
503
518
521
DIFF
522
LINK SCAN
523
SIEZE BUS
517
516
520
ALLOT INTERCEPT LINK
527
510
1
2
5
INTERCEPT BUSY
509
508
515
TO REGISTER SCANNER DECODER
506
START
TO SUPERVISORY ADAPTER CIRCUIT
505
507
534
DIFF.
535
INTERCEPT LINK BUSY
536
TIME DELAY
511
MONO
539
TO RELEASE CIRCUIT
530
531
537
532
538
DIFF
INTERCEPT CALL LOGIC
76

224
601
ANSWER STEP CONTROL
600
TIMER
ANSWER SELECT
604
STRAPPING OPTION
603
A1
A2
A3
A4
A5
A6
A7
A8
A9
A10
A11
A12
PRIORITY
78
RECALL 79
CALL 80
306
900
ANSWER CONTROL

United States Patent Office 3,334,191

Patented Aug. 1, 1967

3,334,191

ELECTRONIC QUEUING SYSTEM HAVING RECALL, INTERCEPT AND PRIORITY MEANS

Roger E. Arseneau, Elkgrove Village, and John Bereznak, Oak Lawn, Ill., assignors to International Telephone and Telegraph Corporation, New York, N.Y., a corporation of Delaware Continuation of application Ser. No. 361,299, Apr. 20, 1964. This application Oct. 26, 1964, Ser. No. 406,358

7 Claims. (Cl. 179—27)

ABSTRACT OF THE DISCLOSURE

An electronic switching telephone system has access to a plurality of queue storage circuits via an auxiliary network. The calls are called out of queue according to age and priority. Included among the queues is an intercept queue which may forward calls to any arbitrarily selected telephone location in the system.

This invention relates to telephone systems and more particularly to systems for queuing calls. This is a continuation of our co-pending application S.N. 361,299, filed April 20, 1964, now abandoned.

Telephone queuing circuits are used when calls require equipment which is not immediately available. These circuits are adapted to store a memory of each call making a demand for such unavailable equipment as each demand is received. As soon as the demanded equipment becomes idle, the stored calls are automatically routed to it in the order of the queue.

The calls stored in the queue may be segregated into any convenient categories. The most obvious categories include time of demand, priority of call, or type of equipment demanded. In addition, queuing may be used to provide any appropriate special features such as camp-on busy conditions.

Queuing circuits of the type described herein may be used wherever there is a need. However, they have particular value in association with an electronic switching telephone system disclosed in our co-pending application entitled, "Electronic Switching Telephone System," S.N. 181,626, filed Mar. 22, 1962, now U.S. Patent 3,221,105.

Accordingly, the object of the invention is to queue telephone calls according to the age and type of call.

A further object is to store calls for unavailable equipment and then to extend the stored calls to the demanded equipment, such as an operator position, as soon as possible according to an established priority.

Yet another object is to extend calls of one type to one type of equipment and calls of another type to another type of equipment, or alternatively to either of two operator positions or a combination of equipment and positions.

In accordance with an aspect of this invention, a queuing circuit is coupled to a point in a switching network where the traffic is most concentrated. Each incoming call which requires an unavailable piece of equipment or the attention of a busy operator is extended into a queuing circuit where it is stored, e.g. by age and priority. The demanded equipment or operator position is provided with means for calling in and accepting the stored calls as soon as they can be processed. In this manner, the queuing circuits automatically extend the calls in an order whereby the oldest call of any given type (such as the mentioned priority type) is served first.

The above mentioned and other features of this invention and the manner of obtaining them will become more apparent, and the invention itself will be best understood by reference to the following description of an embodiment of the invention taken in conjunction with the accompanying drawings, in which:

FIGURE 1 is a block diagram which shows the principles of the invention;

FIGURES 2–9 are to be joined.

BRIEF DESCRIPTION

Figure 2:
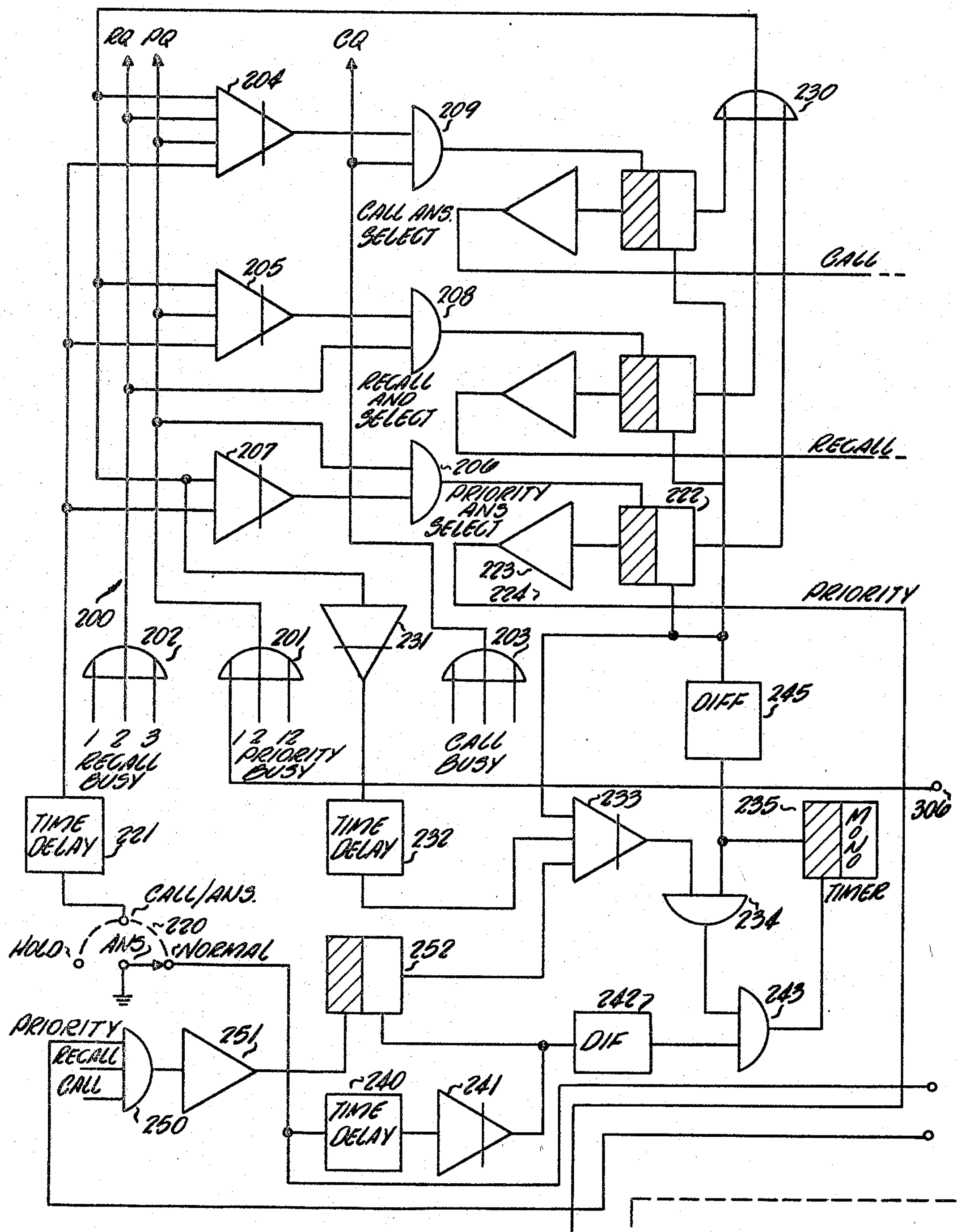
FIGURE 2 is a logic diagram showing a queue select circuit.
Figure 3:
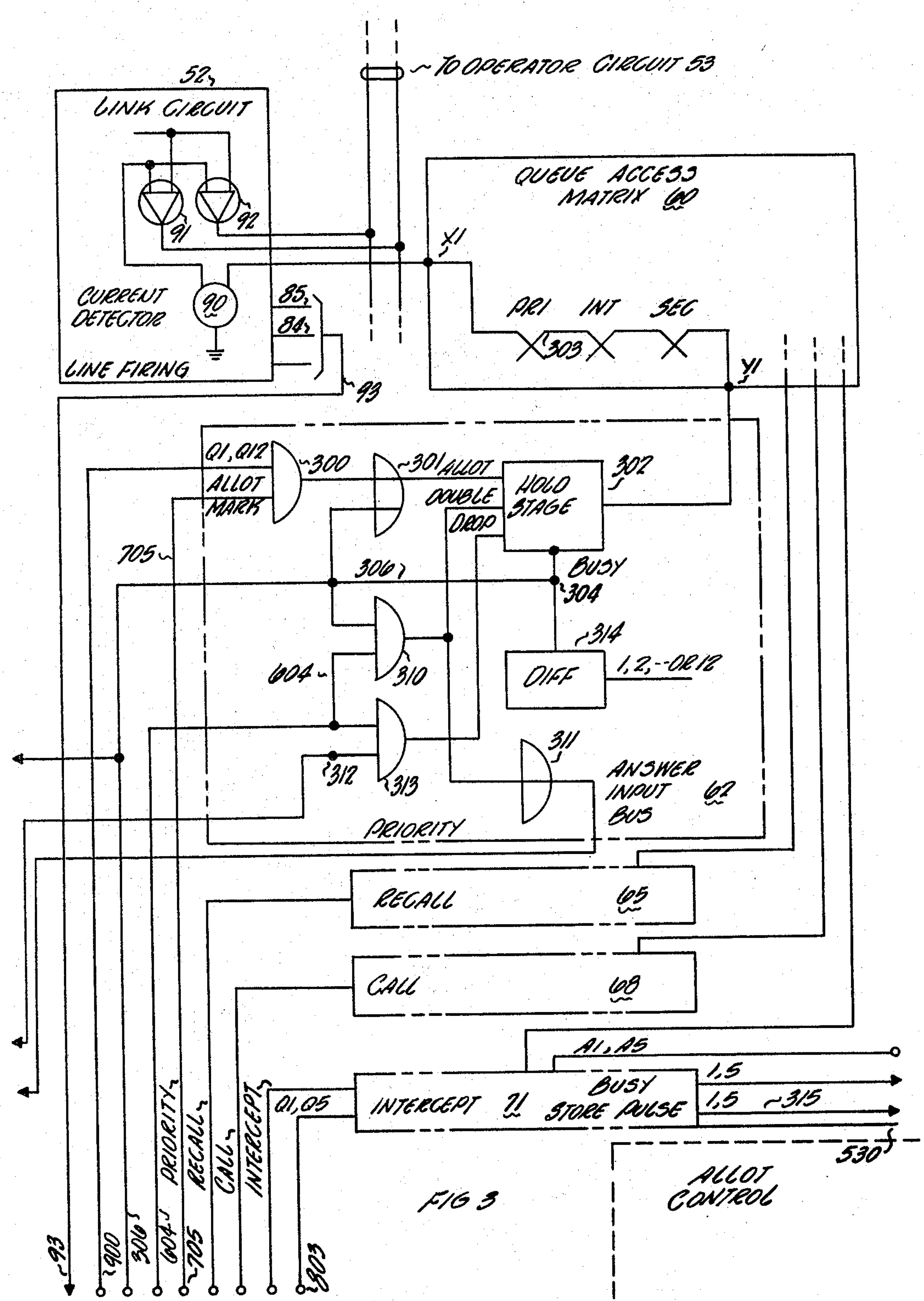
FIGURE 3 is a logic diagram showing an allot control circuit.

FIGURE 1 shows an automatic telephone system comprising a plurality of subscriber lines 50, a switching network 51, a plurality of links 52 for controlling telephone connections through the network, and an operator circuit 53. These items are explained in greater detail in the above mentioned co-pending application. This telephone system provides an exemplary environment for explaining the queuing circuit of our invention. However, the selection of this particular system as an exemplary environment is not to be construed as a limitation upon the invention.

The queuing circuit (all remaining blocks having a reference number higher than 53) is coupled to the end of the network 51 where the traffic is most concentrated. This is apparent from an inspection of FIG. 1. That is, there are many subscriber lines and few links. This is because no one subscriber uses his telephone more than a fraction of the day, and the many lines can share the few links and operator positions. A traffic study will tell how many links and operator positions are required to provide any given grade of service.

Each incoming call which requires the service of either unavailable equipment or a busy operator position is extended into a queuing circuit where it is stored by age and type. More particularly, despite the traffic study there will be times when there are not enough links or operator positions to serve the demands. Thus, each link is connected to a queue access matrix 60 as at point X1, for example. The other side of matrix 60 is connected to a number of allot control circuits 61. By way of example, FIG. 1 shows that matrix 60 may connect any one of the three links 52 to any one of eight allot control circuits: 62–63 for a priority store queue at 64; 65–66 for a recall store queue at 67; 68–69 for a call store queue at 70; or 71–72 for an intercept store queue at 73. The terms "priority" and "intercept" speak for themselves. The term "recall" implies that a subscriber is jiggling his hookswitch to signal an operator. The term "call" is used to give a generic designation of any type call which may be queued. These particular call types (priority, recall, call, and intercept) are, however, intended only as a generic disclosure representing a demand for any equipment which may be unavailable.

The demanded equipment is here represented as an operator position 75 or logic circuitry 76. Again, this is an exemplary showing intended to represent any suitable equipment.

If the operator at position 75 wishes to answer a call, a queue select circuit 77 selects the one of the queues 64, 67, 70, which has the highest priority. Then, a suitable answer control circuit 78–80 directs the oldest call in the selected queue to the attendant position 75. An intercept answer control circuit 81 performs the same function for the logic circuitry 76. This way, the oldest call of any given type (such as the one with the highest priority) is served first.

Each group of allot circuits (such as 62–63, FIG. 1) includes a multi-stage counter driven by an allot marks circuit 82. The allot marks circuit 82 is pulsed by any of the links 52 which is demanding access to equipment that is not available. If circuit 82 is pulsed over bus 83, the call store chain 68–69 is driven one step to store the memory of a call in the call store queue 70. In like manner, if circuit 82 is pulsed over bus 84 or bus 85, the chain 62–63 or 71–72 is stepped to store a call in either of those queues.

The circuit of FIG. 1 works this way. Assume that a calling subscriber line 50 is connected through the switching network 51 to link #1. Assume further that the calling subscriber dials a number which requires an intercept. Link #1 applies an end marking at point X1 and pulses the allot marks circuit 82 over bus 85. The allot marks circuit drives a counting chain 71–72. Each circuit in the chain 71–72 marks an individually associated end point in matrix 60 in a fixed sequence; thus, the chain driven by the allot marks circuit takes a step to select the next available, idle end point Y1. A path now fires from the point X1 through network 60 to circuit 71 which marks point Y1 and holds the path. This path stores a memory of the demand for intercept service.

The chain 71–72 reads-out in the same fixed sequence. When circuit 71 is reached in the fixed sequence, the intercept logic circuitry 76 is connected through a control circuit 81 and matrix 60 to link #1.

DETAILED DESCRIPTION

The best way to orient the block diagram of FIG. 1 with the detail diagram of FIGS. 2–9 is to compare the circuit titles and reference characters. The same numbers and titles identify the same parts in all figures.

It is assumed that the link circuit 52 (FIG. 3) has already been coupled through the switching network 51 of FIG. 1 to the subscriber line 50. Further, it is assumed that the subscriber has dialed a number demanding the services of the priority queue. The link circuits 52 responds by applying a marking of a first characteristic at point X1 and to bus 84 to request a path through the matrix 60 to the priority store circuit 64. Later, to provide a marking of a second characteristic when this queued call is answered, the current doubles in matrix 60 and is detected by a detector 90. When this occurs, gates 91, 92 close to extend suitable paths to the operator 53.

It should now be apparent that the link circuit 52 uses the busses 93 to signal the type of queue call. The link may identify this type of call in any suitable manner as by the detection of a prefix digit, for example. Since the system responds to each type of call in a similar manner, only the priority queue will be explained in detail. Therefore, it should be understood that other circuits not shown in FIGS. 2–9 function in the same manner.

*Priority call*

When the link 52 recognizes the need for a queue storage of a priority call, the bus 84 is marked. Amplifier 700 (FIG. 7) conducts, and inverter 701 switches "off." This removes one input signal to NOR gate 702 and turns "on" the inverter 703. The output of 703 is amplified at 704 and applied to a bus 705. The bus 705 leads to FIG. 3 where it connects to one of two inputs of an AND gate 300.

The store circuit which is next in line in the priority queue stores this call. More particularly, the upper input of the AND gate 300 is marked in the drawing by the symbols "Q1, Q12" which means that there are twelve such AND gates, each connected to an individual one of twelve leads designated Q1, Q2 . . . Q12. The drawing shows only the first such AND gate 300 which is energized from FIG. 9 via wire 900. Each of the remaining AND gates (similar to 300, but not shown), are individually energized from the terminals Q2, Q3 . . . Q12 which appear in FIG. 9. Each of the terminals Q1, Q2 . . . Q12 is energized from an individually corresponding NOR gate controlled by a flip-flop chain 901. Those familiar with flip-flop chains and binary counting will readily perceive how this is done.

Each time that a pulse appears on conductor 902, the flip-flop chain 901 takes one step which is identified by a binary code. On each step, the output of each flip-flop circuit in the chain appears on one or the other side, such as side $\overline{A}$ or side A, to give the binary coded combination. The outputs of the various flip-flop circuits in chain 901 are coupled in the coded combination to the inputs of the twelve NOR gates 903. For clarity, the drawing shows only the $\overline{A}$ connections; however, it should be understood, that all other connections are made in a similar manner. For example, the remaining three inputs of the NOR gate 904 are connected to the terminals B, C, D of the chain 901. Thus, the gate 904 conducts in response to the coded signals $\overline{A}$, B, C, D. In like manner, NOR gate 905 conducts in response to the coded signals, A, $\overline{B}$, C, D, and NOR gate 906 conducts in response to the coded signals, A, B, $\overline{C}$, $\overline{D}$.

The NOR gate 907 resets the counter 901 after a suitable number of output conditions have occurred. Thus, if the priority queue is able to store twelve calls (as shown in FIG. 1) the NOR gate 907 resets counter 901 on the seventh pulse. An alternative modification provides a reset via a strapping 909 which may be connected from any output terminal Q1–Q12 to the reset terminal. It is here shown as connected to terminal Q7, for example, which allows six positions for the queue. In yet another embodiment, any logic circuitry connected to terminal 910 may cause reset, as for example when power is first applied to the system.

Assuming that the call being described is to be stored in the first position of the priority queue circuit, NOR gate 904 is standing in a conducting condition to cause a coincidence at the inputs of AND circuit 300 (FIG. 3) when the priority bus 84 is marked from link 52. The output of AND circuit 300 is fed through an OR circuit 301 to an ALLOT terminal on a HOLD STAGE 302. This causes an end-marking to be applied to point Y1 while the link is applying another end-marking to point X1. A path 303 now fires from point X1 through the matrix 60 to the point Y1. Current flows at a given level over the completed path in order to provide an electrical signal having the first characteristic.

When this occurs circuit 302 latches to hold the path and marks terminal 304 to indicate that the path is busy. The busy marking is sent over conductor 306 to OR gate 911 and inverter 912. The output of the inverter 912 is a signal which steps the flip-flop chain 901. The NOR gate 904 turns "off," and the NOR gate 905 turns "on." This deenergizes the upper input of the AND gate 300 shown in FIG. 3, and energizes the upper input of another similar AND gate associated with the next position in the queue circuit.

Means are provided for automatically extending queued calls to the operator (or other requested equipment) in an established order. In greater detail, reference is made to FIG. 2 which shows the logic circuitry that selects the one of queues 61 which is given precedence at the operator position. This circuit is controlled by logic 200 which is activated by the busy signal that appears on conductor 306 when any call is stored in any queue circuit.

Three OR gates (such as 201) are individually associated with the queues according to the types of stored calls. Thus, the OR gate 201 conducts whenever a call is stored in the priority queue. The OR gates 202 and 203 conduct when calls are stored in the recall and call queues respectively. Each of these OR gates is individually connected to a NOR gate which enables the queue storing calls having the highest priority and inhibits queues storing calls of a lower priority. Thus, a priority call (which is assumed to have the highest rank) causes a signal to feed from bus 306 through OR gate 201 to energize and thereby inhibit NOR gates 204, 205 which are associated with the call and recall queues, respectively. At the same time, the signal from OR gate 201 appears at the upper input of AND gate 206 to prepare for a coincidence with the output of the NOR gate 207. The lower input of NOR gate 207 is energized at this time.

In like manner, the output of OR gate 202 inhibits NOR gate 204 and enables AND gate 208. The output of OR gate 203 enables AND gate 209 but does not inhibit the NOR gate of any other queue.

It should now be clear that if every one of the queues 64, 67, 70 stores a call, an output signal will be able to appear only at the output of the AND gate 206, thereby giving first choice to the priority queue. If no priority calls are present, an output signal may appear at AND gate 208 to give it the second choice to the recall queue. The AND gate 209 conducts to give the last choice to the call queue only if no other calls are present.

Nothing further happens at this time to expedite the completion of a queued call. However, if more queue calls are received, more paths are fired from an appropriate one of the links 52 (FIG. 1) to the appropriate allot control circuits 61. For example, a path could fire from LINK #2 to ALLOT CONTROL circuit 66 to queue a "Recall" call.

To answer a call, the operator always controls the same switch—it is not necessary to make queuing decisions at the operator level. In greater detail, the operator moves a switch 220 to the CALL ANS position to select the next queue call. Responsive thereto, a time delay circuit 221 briefly deenergizes the lowermost input of each of the NOR circuits 204, 205, 207. If any queue call is present, the uninhibited ones of the NOR gates 204, 205, 207 conduct, and the enabled one of the AND gates 206, 208, 209 conducts. With the assumed call, the priority AND gate 206 conducts.

Figure 9:
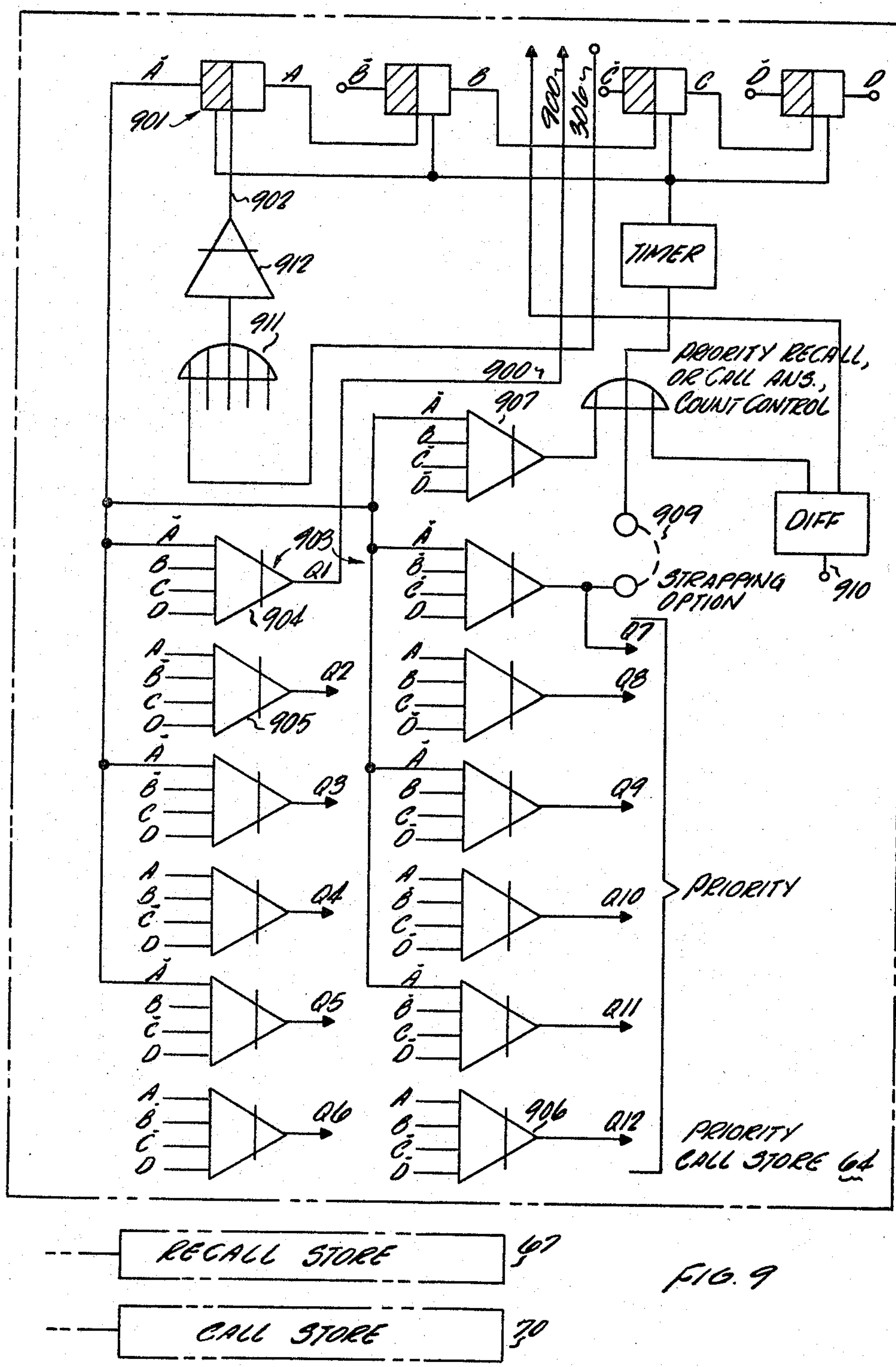
FIGURE 9 is a logic circuit showing a priority call store circuit.

The flip-flop 222 switches from its shaded to its unshaded side and deenergizes an amplifier 223 which had fed a signal over a bus 224. The output of amplifier 223 disappears to cause an inverter 600 to switch on and pulse the flip-flop chain 601. The chain 601 advances to select the next queued call stored in the priority call store circuit 64 (FIG. 9). It does this by selectively energizing the input terminals of a NOR gate chain 603, constructed and connected in a manner similar to the NOR gate chain 903, explained above.

If it is assumed that the next queued call, about to be served, is stored in queue circuit Q1, the NOR gate chain 603 will energize its output terminal A1. Except for convenience of description, there is no reason why this assumption must be made—any "A" terminal may be selected and any number of "priority" calls may be stored in the queue. The energization of terminal A1 sends a signal over conductor 604. There is coincidence at AND gate 310 if the calling subscriber has not hung-up to remove the busy indicating potential from the bus 306. The output of the AND circuit 310 feeds through an isolation device 311, OR gate 250, and amplifier 251 to switch the flip-flop 252 to its unshaded side. This energizes the lowermost input to the NOR circuit 233 to prevent any premature release. The output of the AND circuit 310 also doubles the current flowing over the path 303 through the matrix 60. This doubled current provides an electrical signal having the second characteristic.

When the current doubles, the detector 90 closes gates 91, 92 and connects the link of the queued call being answered to the operator circuit 53. The operator talks to the subscriber and serves any call needs.

To release the call, the operator returns the key 220 to its NORMAL position where it energizes terminal 312 to make AND gate 313 conduct. The output of AND gate 313 energizes the DROP bus leading into the HOLD STAGE 302. Path 303 is released.

Also, when the operator restores the key 220 to normal, there is a time delay measured by circuit 240. Thereafter, the inverter 241 turns off, and the flip-flop 252 switches to its shaded side. When inverter 241 ceases to conduct, NOR gate 233 switches on because its lowermost input is deenergized. There is a coincidence at the input of AND gate 234 because the monostable flip-flop 235 normally stands with an output from its shaded side. Also, the output of inverter 241 is differentiated to momentarily energize the lowermost input of AND gate 243. The AND gate 243 conducts and triggers the monostable multivibrator 235.

The monostable multivibrator 235 switches its unshaded side off then on again. This causes the differentiator 245 to give an output pulse and reset the flip-flops (such as 222). Also, the output of the differentiator 245 inhiibts NOR gate 233 to terminate the release function.

When the flip-flop 222 (or any of the similar flip-flops) had an output from its unshaded side, OR gate 230 conducts to inhibit all of the NOR gates 204, 205, 207 and to switch off the inverter 231. This prevented a conflict of queue seelctions. When the flip-flop 222 switches off its unshaded side after completion of the release function, inverter 231 turns on to inhibit the NOR gate 233 at its middle input. The release function is complete, and the operator is ready to take the next call.

The RECALL and CALL queues 67, 70 are essentially the same as the PRIORITY queue 78. Distributed through the drawings are various dot-dashed rectangles bearing words "recall" and "call." These rectangles are duplicates of the circuits that are shown in the same figure. They serve the same function as the similarly located blocks in FIG. 1 which are explained in detail. The intercept queue is different, however, because it feeds into logic circuitry adapted to connect to a telephone station—or any other suitable equipment.

*Intercept*

Briefly, intercept occurs whenever a call cannot be completed in a normal manner. For example, the directory number dialed by the calling subscriber may be incomplete or nonsensical. Or it could identify a non-existent line. The purpose of the intercept queue is to route all of these calls to a single location which could be an ordinary telephone at a receptionist desk or a guard station. Or it could be an intercept operator position.

An important feature of the invention is that the intercept function may be performed at any location in the system since it may be performed from an ordinary telephone. This way, the system is very flexible because the user may assign anyone to answer calls which require the services of an operator or attendant. As will become more apparent, this flexibility is possible because the intercept call logic circuit contains a simple register for storing a directory number identification of the telephone supplying the intercept service. That number may be changed to alter the destination of intercepted calls at will.

When an intercept call is taken out of the queue, a logic circuit commands the switching equipment in the telephone exchange to extend the queued call to the identified telephone in a manner so that all calls are extended to a called number. At the same time, a signal is sent over a start wire to any suitable equipment required to adapt the call to the needs of the answering equipment. Thus, the start wire may lead to one type of adapter equipment to provide supervision when calls are answered at a switchboard and to another type of adapter equipment to provide other supervision when calls are answered at a telephone station. In like manner, any suitable equipment may be used to serve the needs of any answering equipment.

Figures 8, 10:
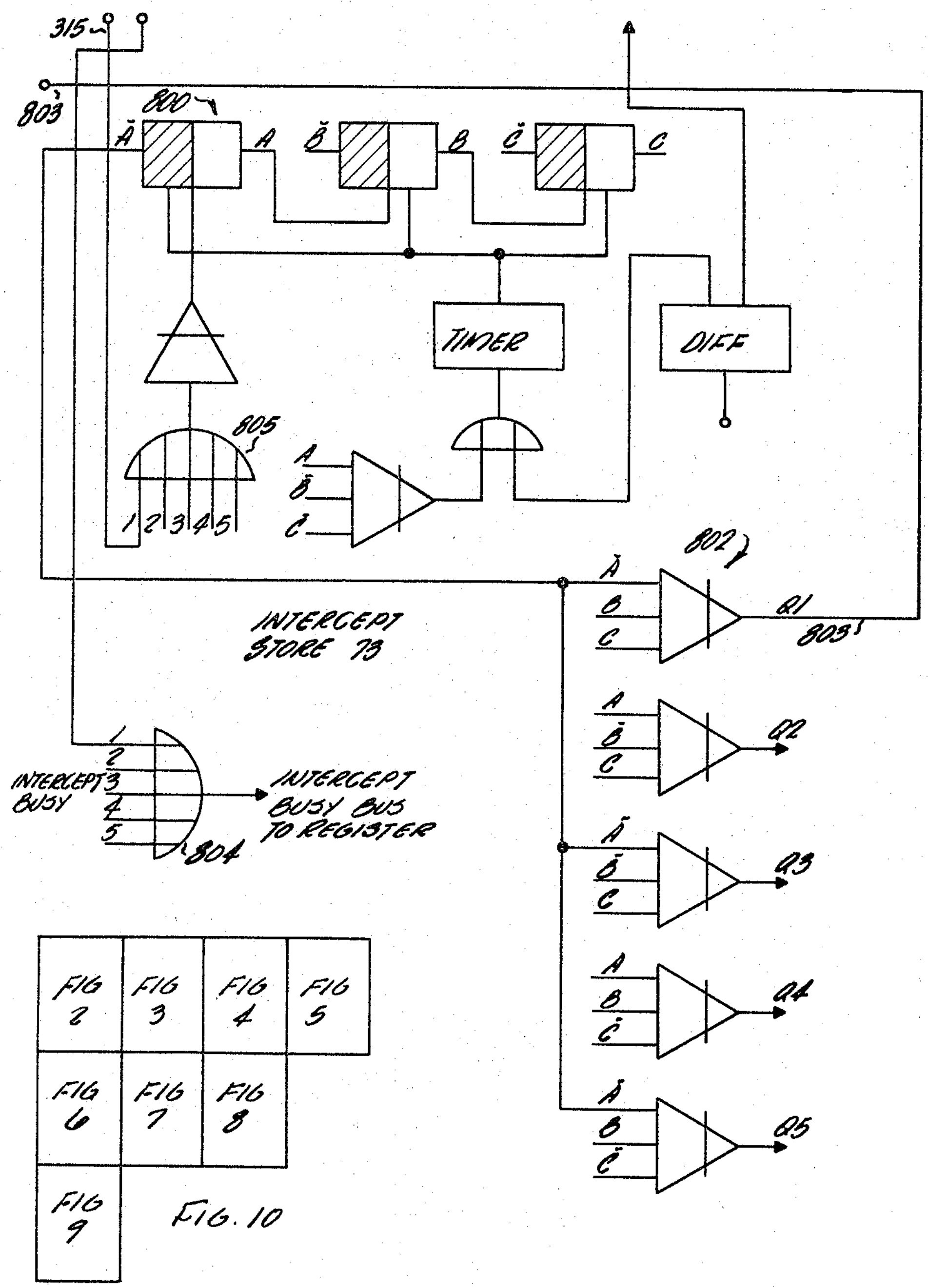
FIGURE 8 is a logic circuit showing an intercept store circuit.
FIGURE 10 is a layout showing how

In greater detail, the invention assumes that the telephone system recognizes the need for an intercept service when calls cannot be completed in a normal manner. For example, a register may recognize when it fails to receive a full complement of digits or when it reaches unequipped terminals. Responsive to such recognition, the system causes the link 52 to mark the intercept bus 85. This marking causes a storage of the intercepted call in the queue 73 (FIGS. 1 and 8). The queue logic 76 (FIGS. 1 and 5) then issues commands ordering the switching system to call in the location equipped to serve the intercepted call needs. This is done via a special intercept link circuit 98 (FIG. 1).

The details of the intercept queue will become more apparent from a study of FIGS. 3–5, 7, and 8.

The HOLD STAGES in the intercept allot control circuit 71 (FIG. 3) contains a differentiator (as shown above at 314) which marks the bus 315 when the intercept queue stores a call. This differentiator does not appear in the HOLD STAGE of any allot control circuits other than those of the intercept queue. Otherwise, the circuit 71 may be viewed as identical with the circuit 62.

Before an intercept call is received, the flip-flop chain 800 stands in some fixed position to enable one of the NOR gates 802 via connections which should be obvious from the foregoing description of FIG. 9. When an intercepted call is received, a link fires a path (similar to 303) to the intercept queue circuit marked at a point such as Y1 under the control of an AND circuit similar to 300. The particular queue circuit which receives the path is selected by the one of the "Q" terminals which is energized in FIG. 8. For example, if the first or Q1 circuit is available, this selection might be made via conductor 803.

As soon as the path 303 is completed, the HOLD STAGE circuit 302 in circuit 71 marks OR gate 804 to request the service of the intercept call logic circuit 76. The differentiator 314 pulses OR gate 805 via lead 315 to step the flip-flop chain 800. Terminal Q1 is deenergized and terminal Q2 is energized. The queue is now ready to store the next intercepted call.

Figure 4:
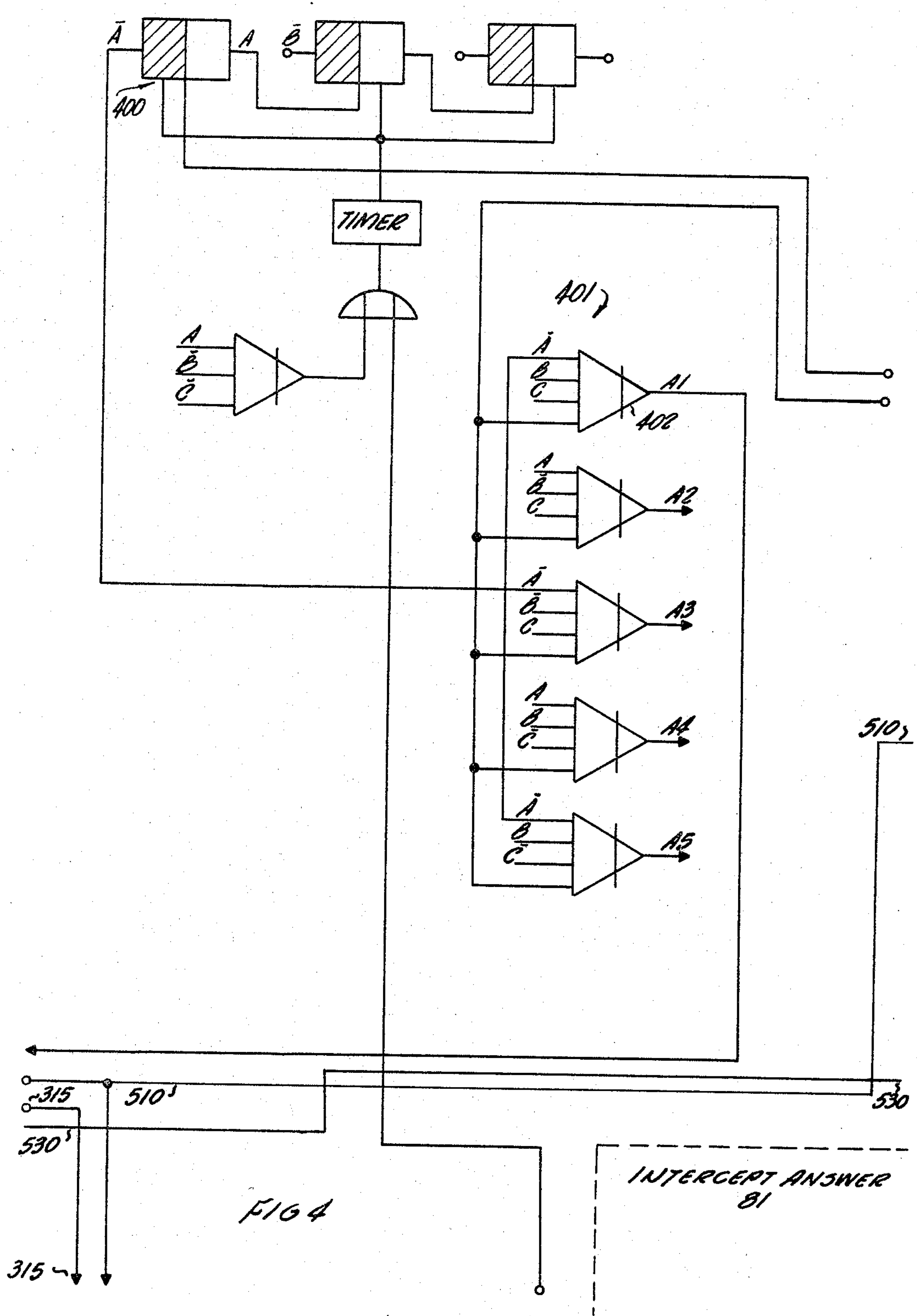
FIGURE 4 is a logic diagram showing an intercept answer circuit.
Figure 5:
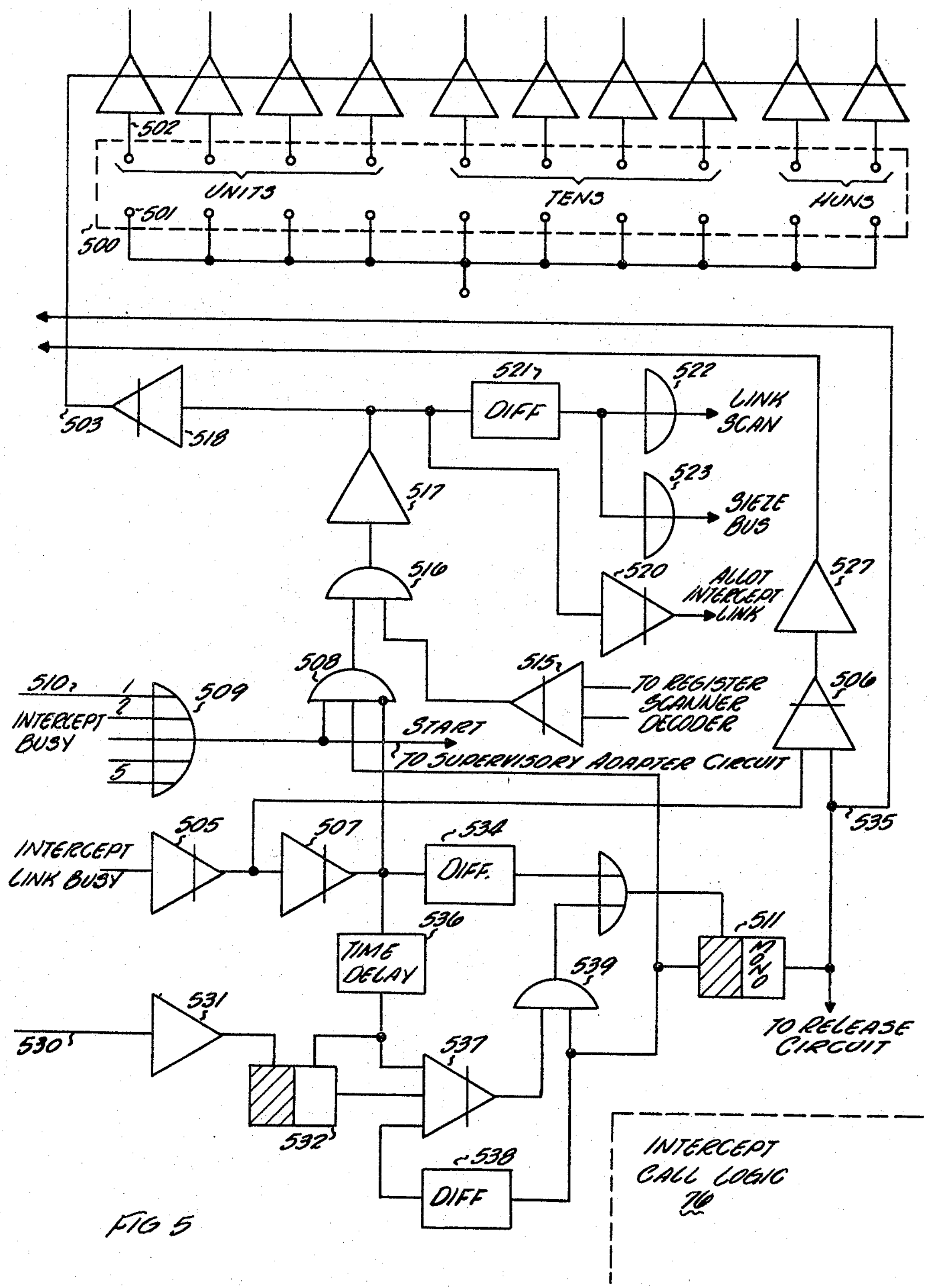
FIGURE 5 is a logic circuit showing an intercept call circuit.
Figure 6:
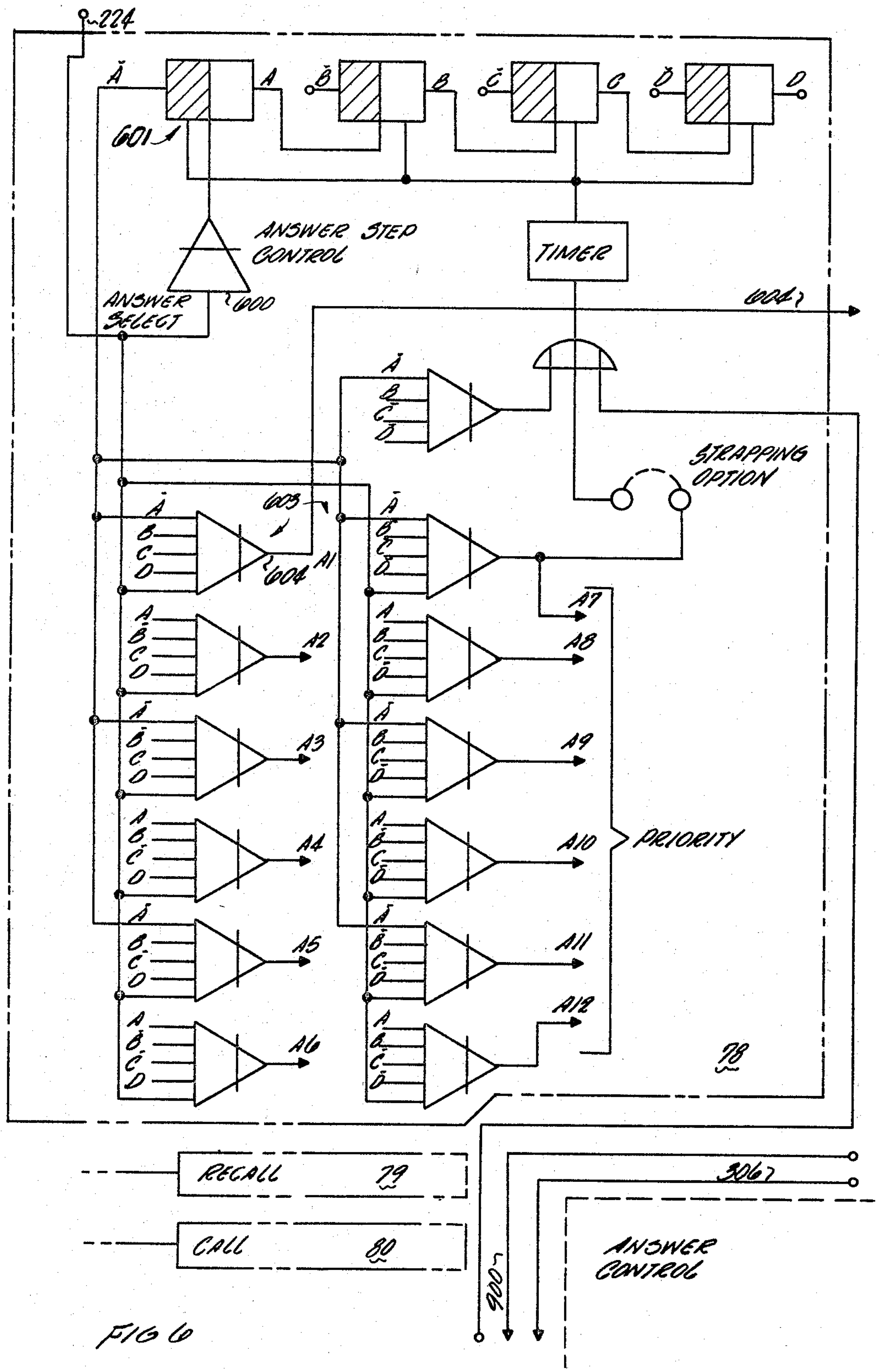
FIGURE 6 is a logic circuit showing an answer control circuit.
Figure 7:
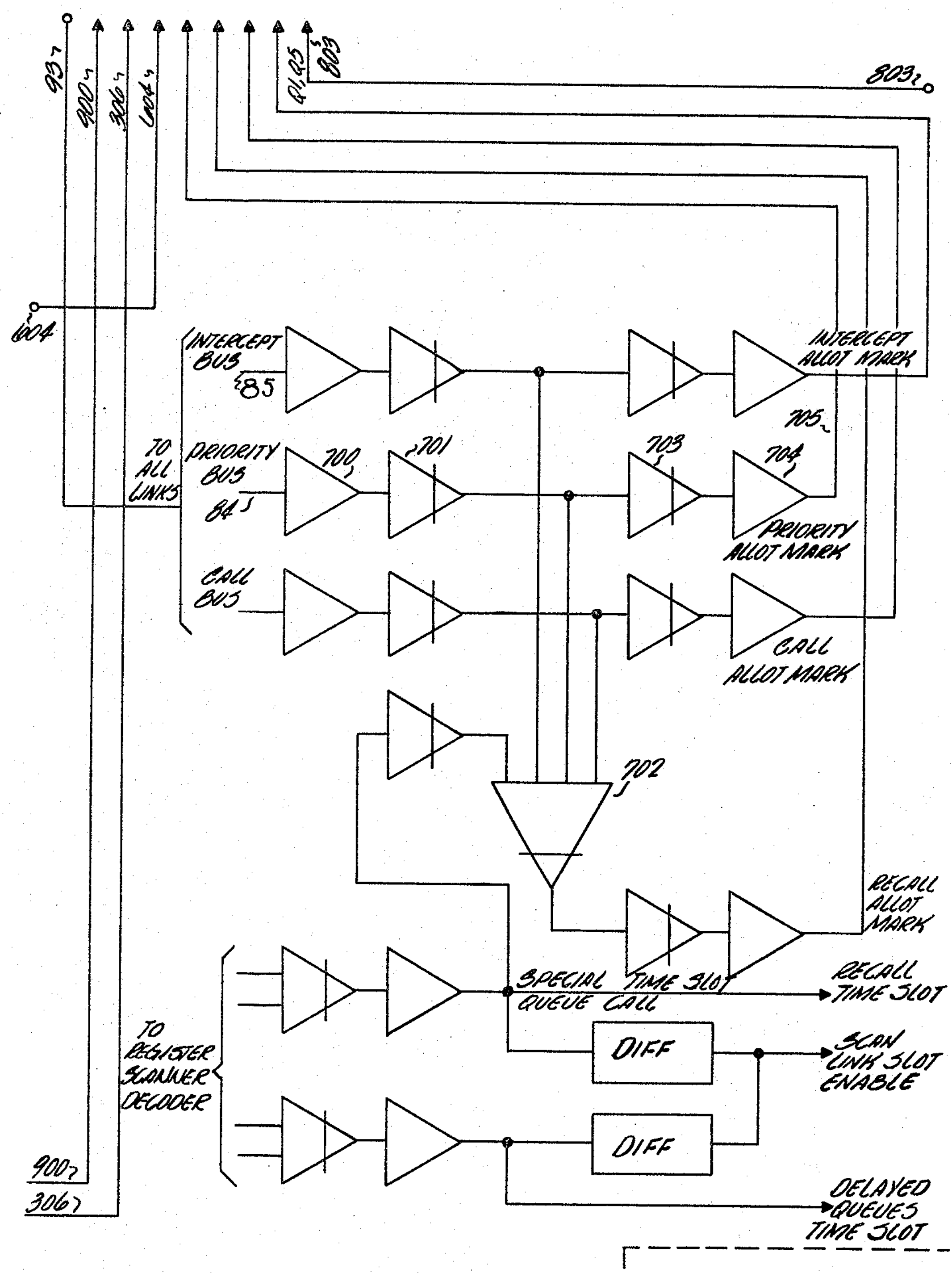
FIGURE 7 is a logic circuit showing an allot marks circuit.

The intercept answer circuit of FIG. 4 is similar to that of FIG. 6 which has already been explained. The flip-flop chain 400 stands in a position which is such that the "A" terminal that is energized identifies or selects the call in the queue which is the next to be answered. Thus, if the NOR circuit 402 has an output, terminal A1 is energized, and the queue circuit corresponding to Q1 is the next to be answered. The effect caused by the output at terminal A1 (FIG. 4) is essentially the same as that caused by an output at the terminal A1 in FIG. 6. Current is doubled over the path through the matrix 60, and the talking circuit is extended from a link 52 to an intercept call logic circuit 76.

Means are provided for converting the supervisory signal indicating an intercepted call into the numerical identification of any arbitrarily selected telephone or operator position in the system. More particularly, the intercept call logic (FIG. 5) is the circuit which controls the interception of calls. Suitable straps are connected across an identification or jumper field 500 to identify the line which is equipped to receive the queued calls and give the intercept service. For example, if a jumper is connected from terminal 501 to terminal 502, the intercepted calls may be directed to a line having a directory number with the digit "1" in the units position. The tens and hundreds digits of the directory number are identified in a similar manner. The wire 503 is an inhibit wire which, when energized, prevents a read-out of the identification field 500. Thus, the intercepted call may be extended only when the wire 503 is deenergized.

If an intercept link (such as 98, FIG. 1) is idle, a signal is returned to turn on the inverter 505 and, therefore, to turn off a NOR circuit 506 and an inverter 507. When the NOR circuit 506 turns off, an inhibit is removed from the lower input of each of the NOR circuits 401. When the inverter 507 turns off, an inhibit is removed from an AND circuit 508. The removal of the inhibit from the NOR circuits 401 allows a read-out of the selected queue, and the removal of the inhibit from the circuit 508 allows a demand to be made for the read-out.

Means are provided for adapting the intercept call logic circuit to receive and send the supervision required by any suitable device, such as an ordinary telephone set. In greater detail, when an intercept call occurs, an OR gate 509 conducts because the wire 510 is energized, just as the wire 306 is energized from the HOLD STAGE 302. The OR gate 509 output marks a START wire which leads to an adapter circuit for providing any required supervision or other circuit operations. Thus, the intercepted call might be extended to either a special operator position or an ordinary telephone according to the user's needs.

This output from gate 509 also marks the left-hand input of the AND gate 508. The middle input of AND gate 508 is normally marked from a flip-flop 511 when the INTERCEPT CALL LOGIC circuit is idle. The right-hand input of the AND gate 508 is enabled (the inhibit is removed) by inverter circuit 507 if there is an idle intercept link circuit. These may be special links (such as 98) in the group of links 52 (FIG. 1). They are the same as other links except that they may have any required intercept capability built into them.

When there is a coincidence of a demand for an intercept call service, an idle intercept logic circuit 76, and an idle intercept link, the AND gate 508 conducts. The intercept call logic circuit 76 is assigned a time for operation within the telephone system. This time may be a cyclically occurring event, such as a register time slot as described in our above identified "electronic switching telephone system." Alternatively, the time for the operation of circuit 76 could be assigned on a random demand basis when equipment is ready to function. In any event, the NOR gate 515 conducts when the circuit 76 is free to operate. This provides the coincidence required to make AND gate 516 conduct.

The output of AND gate 516 is amplified at 517 to turn off the inverter 518 and remove the inhibiting potential normally applied to conductor 503. The result is that the directory number stored in the jumper field 500 is read out to cause the normal telephone switching equipment to seize the location provided to serve intercepted calls just as any called line is seized.

Also responsive to the output of the amplifier 517, the inverter 520 turns off to allot the intercept link circuit 98. A differentiator 521 sends a pulse through two gates 522, 523 to command associated switching equipment to extend a path from the line identified by the read-out at 500 to the link allotted at 520. The words "Link scan" and "Seize bus" also appear in our earlier application and are used in FIG. 5 to provide the reader with an example of how a system may be controlled. Those skilled in the art will readily perceive how other systems may be controlled.

The instant when the allotted link becomes busy, a potential appears to turn off the inverter 505 and, therefore, to turn on NOR gate 506 and inverter 507. The output of NOR gate 506 inhibits all of the NOR gates 401 to prevent the selection of another queue at this time. The output of the inverter 507 inhibits AND gate 508 to prevent any demand for an intercept service.

When the call is intercepted, the HOLD STAGE (such as 302) doubles the current through the matrix 60. This causes the link 52 either to extend the call via gates 91, 92 or to drop the call in favor of link 98, as required by the system.

After the operator has completed all tasks required by the intercepted call, the link 98 is released. This marks conductor 530 to turn on amplifier 531 and switch the flip-flop 532 to its shaded side. Also, inverter 505 turns on and inverter 507 turns off. The off going signal is differentiated at 534 to pulse a monostable multivibrator 511. For a period of time, the circuit 511 has an output from its unshaded side to hold the NOR gate 506 on and maintain the inhibit at NOR gates 401. During the same period of time a signal is sent over the wire 535 to step the flip-flop chain 400, thus selecting the intercept call which is next in the queue. After a moment, the monostable multivibrator 511 returns to its shaded side to reenable the AND circuit 508 by energizing its middle input. There is a time delay measured by the circuit 536 which is adequate to insure a proper operation. Then the circuit 536 conducts to switch flip-flop 532 to its unshaded side and to inhibit NOR gate 537. The circuits 532, 537, 538, 539 cooperate to insure a proper reset of the circuit 511 under all conditions.

While the principles of the invention have been described above in connection with specific apparatus and applications, it is to be understood that this description is made only by way of example and not as a limitation on the scope of the invention.

We claim:

1. An automatic telephone system having a plurality of queuing circuits, a plurality of subscriber lines, means for extending a plurality of different types of telephone calls from said subscriber lines to said queuing circuits, said calls being classified by type, means responsive to the extension of each call for transmitting an electrical signal having first characteristics of a continuous current flow at a given level to one of said queuing circuit according to the type of call, means responsive to the receipt of said signal for receiving and storing said calls in the queuing circuit according to the type of said calls and the time when said calls are received, at least one operator position, means for selecting the queue of the class of said calls having the highest priority, and means responsive to an operator control signal received from said position for automatically extending the oldest call in the selected queue to said operator.

2. The circuit of claim 1 wherein said means responsive to the receipt of said operator control signal changes the current level of the signal sent to said queuing circuit and means responsive to said change in current for extending said queued call to said operator position.

3. The circuit of claim 2 wherein said first characteristic is provided by a voltage for causing current to flow at a given level and said characteristics changing means comprises means for increasing said current flow to a level which is higher than said given level.

4. The telephone system of claim 1 wherein there are at least two of said operator positions, some of said positions accepting calls stored in at least one type of queue and other of said positions accepting calls stored in another type of queue, means in said queuing circuit for sending different supervisory signals to said positions according to the type of the position which serves the queued calls, means associated with at least one type of said queues for converting at least some of said supervisory signals into a numerical identification, and means responsive to said identification for extending said queued call to any telephone so identified.

5. A queuing circuit for an automatic telephone exchange, said exchange comprising a plurality of subscriber lines, a switching network for extending calls between said lines, a plurality of queuing circuits, means in said network for extending a telephone call from one of said lines to a particular one of said queuing circuits when it cannot be completed in a normal manner, means effective on the extension of each call to a queuing circuit for transmitting an electrical signal having a first characteristic from the equipment in said exchange to said queue, means responsive to the receipt of said signal for storing said call in one of said queues selected according to the priority of the call and the time when the call is received, at least one arbitrarily selected telephone location in said exchange for providing services required to complete at least some of said queued calls, means responsive to the removal of a call from storage in the one of said queues requiring said services for automatically extending the oldest call in said queue through said switching network to said location, and means responsive to the extension of said call to said one location for providing supervisory signals required at that location.

6. The circuit of claim 5 and means responsive to the selection of said oldest call in said queue for changing the signal to have second characteristics, and means in said exchange responsive to said change in characteristics for extending said oldest queued call to said one location.

7. An automatic telephone system comprising a plurality of subscriber lines interconnected by a switching network, means for extending telephone calls through said network, a queuing circuit, means in said network for extending those of said calls which cannot be completed because demanded equipment is unavailable from the line making such call to said queuing circuit, means responsive to the extension of each call to said queuing circuit for transmitting voltage control signal through said network in a first direction to said queue circuit, means responsive to the receipt of said voltage signal for storing said calls in said queue according to the priority of the calls and the time when said calls are received, at least one location in said exchange for providing services required to complete said calls in said normal manner, means responsive to the removal of a call from storage in said queue for automatically extending the oldest call with the highest priority to said location, and means responsive to the extension of said call to said location for transmitting current signals back through said network in an opposite direction.

References Cited

UNITED STATES PATENTS

| | | | |
|---|---|---|---|
| 2,886,656 | 5/1959 | Schneider | 179—27.2 |
| 2,923,777 | 2/1960 | Schneider | 179—27.1 |
| 2,935,627 | 5/1960 | Schneider | 179—27.1 X |

KATHLEEN H. CLAFFY, *Primary Examiner.*

L. A. WRIGHT, *Assistant Examiner.*